United States Patent [19]

Fujimoto et al.

[11] 4,388,186

[45] Jun. 14, 1983

[54] SLUDGE TREATING APPARATUS

[75] Inventors: Tadao Fujimoto, Kobe; Tadaaki Kawasugi, Nara, both of Japan

[73] Assignee: Kubota Ltd., Osaka, Japan

[21] Appl. No.: 297,257

[22] Filed: Aug. 28, 1981

[30] Foreign Application Priority Data

| | | |
|---|---|---|
| Mar. 7, 1980 [JP] | Japan | 55-29599 |
| Mar. 8, 1980 [JP] | Japan | 55-29533 |
| Jun. 13, 1980 [JP] | Japan | 55-83151[U] |
| Jun. 13, 1980 [JP] | Japan | 55-83160[U] |

[51] Int. Cl.³ .................................................. C02F 11/04
[52] U.S. Cl. ........................................ 210/170; 210/179; 210/180; 210/181; 210/216; 210/218; 210/603; 48/197 A; 435/316
[58] Field of Search ............. 210/218, 194, 609, 603, 210/170, 767–771, 710, 781, 783, 784, 216, 217, 177–181; 48/197 A; 435/801, 316, 167

[56] References Cited

U.S. PATENT DOCUMENTS

| | | | |
|---|---|---|---|
| 3,838,199 | 9/1974 | Samis et al. | 210/603 |
| 4,022,665 | 5/1977 | Ghosh et al. | 210/603 |
| 4,076,515 | 2/1978 | Rickard | 210/609 |
| 4,100,071 | 7/1978 | Beurer et al. | 210/218 |
| 4,203,838 | 5/1980 | Shimizu et al. | 210/603 |
| 4,213,857 | 7/1980 | Ishida et al. | 210/603 |

*Primary Examiner*—Benoît Castel
*Attorney, Agent, or Firm*—W. G. Fasse; D. H. Kane, Jr.

[57] ABSTRACT

A sludge treating apparatus comprises a centrifugal condensing machine for forcedly condensing a raw sludge produced by a waste water treating apparatus. The raw sludge condensed to approximately 94 to 90% in terms of the percentage of moisture content by means of the centrifugal condensing machine is introduced into an anaerobic digestion tank of a deep well type, where the raw sludge undergoes an anaerobic digestion, and a digested sludge obtained from the anaerobic digestion tank is then dewatered by means of a dewatering apparatus such as a belt press, whereupon the dewatered sludge is applied to a post-treatment apparatus. In execution of the anaerobic digestion process, the reactions corresponding to an acid fermentation stage and acid regression stage may be carried out in advance in separate tanks and the reaction corresponding to an alkaline fermentation stage may be mainly performed in an anaerobic digestion tank.

11 Claims, 4 Drawing Figures

SLUDGE TREATING APPARATUS

BACKGROUND OF THE INVENTION

1. Field of the Invention

The present invention relates to a sludge treating apparatus. More specifically, the present invention relates to a sludge treating apparatus for treating a raw sludge produced by waste water treatment through an anaerobic digestion process.

2. Description of the Prior Art

Conventionally an approach has been taken in which a raw sludge produced by a waste water treatment is digested under an anaerobic condition for the purpose of conversion thereof to a digested sludge which is suited for post-treatment. A conventional typical example is that a raw sludge obtained from a settling tank included in a waste water treating apparatus is introduced into an anaerobic digestion tank provided on the ground and the same is retained in the anaerobic digestion tank for a predetermined period of time or a predetermined number of days, say thirty days for the purpose of digestion. The raw sludge produced from the waste water treating apparatus is usually subjected to gravity condensation so that the raw sludge may be condensed to the sludge concentration of approximately 2 to 3%, whereupon the raw sludge is introduced into an anaerobic digestion tank provided on the ground. Such a conventional sludge treating system as described above involved a problem to be solved as set forth in the following.

In the case of the above described conventional system, the condensation ratio of the raw sludge before the same is introduced into an anaerobic digestion tank is small and accordingly a gravity condensation tank and an anaerobic digestion tank each of a large capacity were required. More specifically, the condensation ratio being achieved by a conventional gravity condensation is 2 to 3% at the most as described previously. Accordingly, the ratio of volume reduction due to the gravity condensation is merely ½ to ⅓ at the most. The average retention time in the gravity condensation tank is approximately twelve hours and accordingly the capacity for twelve-hour retaining is required as a capacity of the gravity condensation tank. On the other hand, an average number of days required for digestion in the anaerobic digestion tank is considered to be approximately thirty days. Therefore, the anaerobic digestion tank needs a capacity for retaining the raw sludge as gravity condensed for thirty days. In addition, a predetermined temperature say 35° C. is required for methane fermentation in the anaerobic digestion tank. Therefore, usually the raw sludge is in advance heated before the same is introduced into the anaerobic digestion tank and the warmed raw sludge is introduced into the anaerobic digestion tank. Since a conventional system for introducing a raw sludge as gravity condensed into an anaerobic digestion tank has a small ratio of condensation, energy of large quantity was required for warming the raw sludge in advance. For example, assuming that the ratio of condensation in the gravity condensation tank is 2% and the ratio of capacity reduction is ½, it requires that a half of the raw sludge produced day by day from a waste water treating apparatus is warmed to a predetermined temperature. Thus, it would be readily appreciated how a large amount of energy is required for that purpose. In addition, a conventional anaerobic digestion tank is usually installed on the ground. Accordingly, thermal dissipation from the anaerobic digestion tank is large and surplus energy is required in order to maintain the sludge in the tank to a temperature required for methane fermentation. More specifically, according to a conventional anaerobic digestion tank, even if reaction heat is generated as a function of methane fermentation in the tank, dissipation of heat is larger, as described above, and accordingly the temperature in the tank is lowered after all. In order to maintain the temperature in the tank constant, therefore, more energy is required.

Furthermore, according to a conventional system, the concentration of the raw sludge as condensed by the gravity condensation tank is primarily dependent on the nature of the raw sludge and therefore it is difficult to obtain a uniformly condensed sludge. Accordingly, it follows that the degree of reaction in the digestion tank fluctuates and it could happen that the raw sludge is transferred to a post-treating apparatus before the same is fully digested. Under the circumstances, the benefit of digesting the sludge in advance so as to be suited for post-treatment is lost and reduced.

Meanwhile, conventionally a so-called pressurized floating condensation is also well known, apart from the above described gravity condensation. However, even in the case of a pressurized floating condensation, the ratio of condensation of the raw sludge is 4 to 5% at the most and accordingly the ratio of capacity reduction is also ¼ to 1/5. In addition, the pressurized floating condensation ordinarily requires a dosage of a polymer coagulating agent, a tank, and a compressor with capacity more than 3–5 kg/cm$^2$ discharge pressure for air dissolution in water. Accordingly this condensation method involves a disadvantage that the running cost is extremely expensive. In addition, even in the case of the pressurized floating condensation, the degree of condensation is primarily dependent upon the nature of the waste water and it is difficult or impossible to obtain a raw sludge of uniform concentration.

SUMMARY OF THE INVENTION

Briefly described, the present invention is directed to an apparatus for treating a raw sludge produced by a waste water treating apparatus, which comprises condensation means such as a centrifugal condensing machine for forcedly and mechanically condensing a raw sludge, and a digestion tank of a deep well type for receiving the raw sludge condensed by the condensation means for treating the raw sludge under an anaerobic condition. An anaerobic digestion tank of a deep well type is buried under the ground to extend deeper than 10 m, say as deep as 100 m.

According to the present invention, the raw sludge is mechanically and forcedly condensed by means of a mechanical condensing means, before the same is introduced into an anaerobic digestion tank. Therefore, the capacity of a raw sludge being treated and thus the capacity of the digestion tank can be drastically reduced, as compared with a case where only a gravity condensation tank is utilized, as done conventionally. Assuming that condensation is performed by say 6 to 10% by means of the mechanical condensation means, the capacity of the anaerobic digestion tank can be reduced to ⅓ to 1/5, as compared with conventional system employing gravity condensation. Since the amount of a raw sludge being treated is thus reduced to ⅓ to 1/5 as compared with a conventional case, the energy required for warming the raw sludge to a predetermined temperature say 35° C. before the same is introduced to the anaerobic digestion tank can be drastically reduced. In addition, since the inventive anaerobic digestion tank is buried deep under the ground and is of a so-called deep well-type, the heat dissipated therefrom can be drastically reduced as compared with a conventional one which is installed on the ground. Accordingly, even in a case where the ambient temperature becomes extremely low such as in winter, the temperature in the digestion tank can be maintained to an optimum temperature with much less energy.

In a preferred embodiment of the present invention, the digested sludge in the anaerobic digestion tank of a deep well type is dewatered by means of a dewatering means such as a belt press, filter press, centrifugal dewatering machine or the like. By thus directly dewatering the sludge as digested, sludge of a much smaller percentage of moisture content is advantageously obtained for post-treatment.

In another preferred embodiment of the present invention, another treating tank is provided between the mechanical condensing means and the anerobic digestion tank of a deep well type. It has been well known that the step of anaerobic digestion proceeds through the three stages of an acid fermentation stage, an acid regression stage and an alkaline fermentation stage. During the acid fermentation stage the so-called organic acid producing bacteria acts to produce fatty acid such as acetic acid, butyric acid, propionic acid and the like of a low molecular weight. In the acid regression stage, decomposition of the organic acid and dissolving nitrogen compound takes place to produce ammonia, amine, carboxylic acid and the like, whereby organic acid is regressed. In the alkaline fermentation stage, mainly, methane producing bacteria act so that the organic acid is decomposed to carbon dioxide ($CO_2$) and methane gas ($CH_4$). The range of pH where methane producing bacteria can maintain an active state is relatively severe and is in the range of 6.4 to 7.2. On the other hand, acid producing bacteria can maintain an active state even in the case where pH value is smaller than 6.4. Accordingly, in another preferred embodiment of the present invention, the reaction during the term corresponding to the acid fermentation stage and the acid regression stage is mostly completed in the above described separate tank and the reaction during the period corresponding to the alkaline fermentation stage is mainly performed in the anaerobic digestion tank of a deep well type. According to the embodiment in discussion, the pH values of the separate tank and the anaerobic digestion tank can be separately set, respectively. Accordingly, the pH value can be set to a value most suited for maintenance of activity of the methane bacteria and accordingly the reaction efficiency can be enhanced.

In a further preferred embodiment of the present invention, means is provided for collecting methane gas produced during the alkaline fermentation stage of the digestion process. In the case of a conventional anaerobic digestion tank installed on the ground, methane gas was little produced and stayed at a higher position and accordingly it was difficult to collect methane gas and hence the same was little utilized. By contrast, according to the present invention, anaerobic digestion tank of a so-called deep well type is utilized and therefore the position of a head is low and in addition the area of the head can be made small, which makes it easy to collect methane gas. The reason is that the capacity of anaerobic digestion tank of a deep well type is largely dependent upon the depth rather than the area of the head. The methane gas thus collected can then be effectively utilized as a heat source for a drying machine and other post-treatment apparatuses. Meanwhile, since the raw sludge has been condensed to 6 to 10% by means of a mechanical condensing means before the same is introduced into anaerobic digestion tank, the amount of sludge staying in the digestion tank is increased and accordingly generation of methane gas becomes more active than a conventional one and thus a large amount of methane gas can be produced.

Accordingly, a principal object of the present invention is to provide a sludge treating apparatus, wherein the capacity of an anaerobic digestion tank can be reduced in particular as compared with a conventional one and hence the space factor is improved.

Another object of the present invention is to provide a sludge treating apparatus, that can drastically save required energy.

A further object of the present invention is to provide a sludge treating apparatus of an improved treatment efficiency.

Still a further object of the present invention is to provide a sludge treating apparatus, wherein produced methane gas can be effectively utilized.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
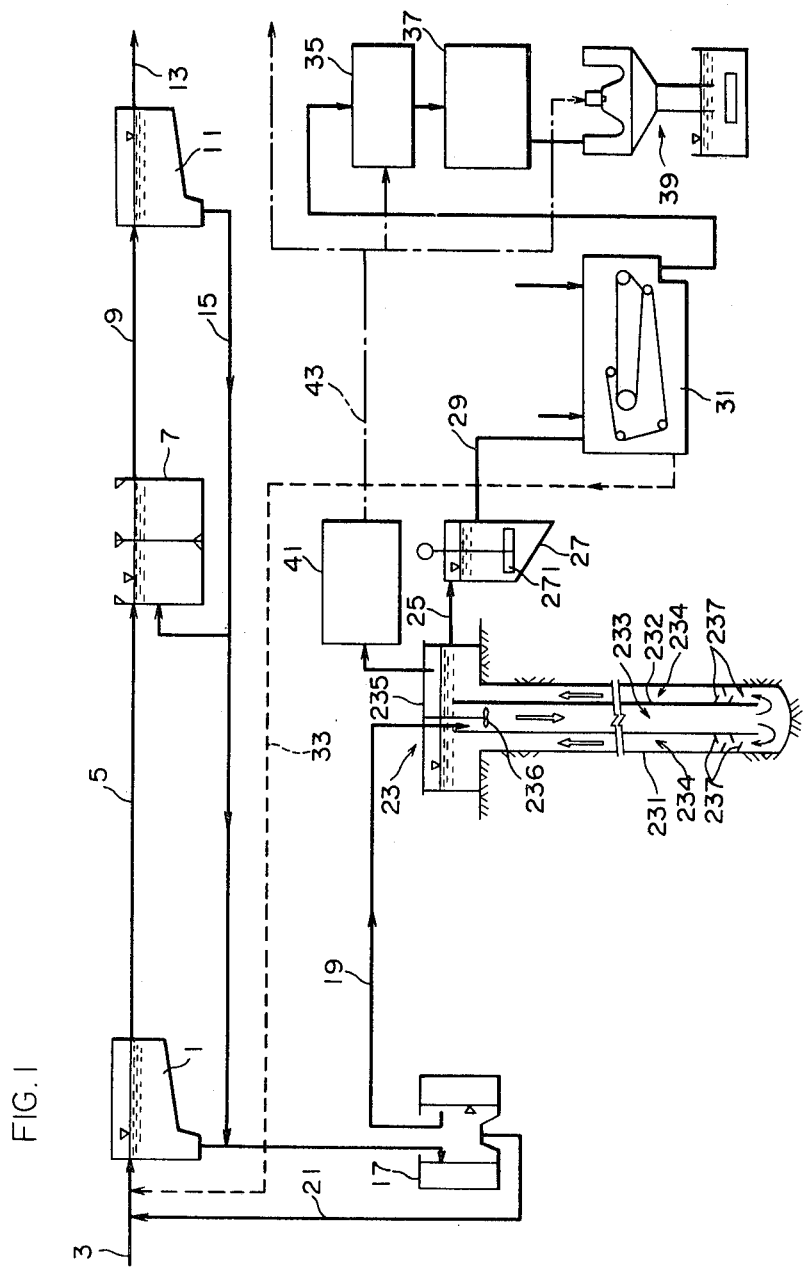
FIG. 1 is a flow diagram showing one embodiment of the present invention.

FIG. 1 is a flow diagram showing one embodiment of the present invention. Referring to FIG. 1, a waste water such as domestic waste water, industrial waste water and the like is supplied from a waste water supply pipe 3 into a first settling tank 1 included in a waste water treating apparatus. The supplied waste water is naturally settled or precipitated in the first settling tank 1 so that the same is separated into a raw sludge and a supernatant liquid. The separated supernatant liquid is supplied through a pipe 5 to an aeration tank 7. The supernatant liquid is treated in the aeration tank through an activated sludge treating process. The mixed liquor processed by the aeration tank 7 is supplied through a pipe 9 to a final settling tank 11. The raw sludge is then separated through settlement in the final settling tank 11. A supernatant liquid in the final settling tank 11 is discharged through a pipe 13. The sludge as settled in the final settling tank 11 is returned through a sludge return pipe 15 to the above described aeration tank 7 as a return sludge and is also applied together with the raw sludge separated by the first settling tank 1 to a mechanical condensing means 17, which constitutes an essential feature of the present invention. The present invention is directed to an apparatus for treating a sludge produced by a waste water treatment as described above.

The mechanical condensing means 17 is an apparatus for forcedly and mechanically condensing a raw sludge being supplied, such as an upright type centrifugal condensing machine, a lateral type centrifugal condensing machine, cyclone or the like. More specifically, the centrifugal condensing machine 17 receives a raw sludge from the first settling tank 1 and the final settling tank 11 to condense the same to the sludge concentration of 6 to 10%. Assuming that the concentration of the sludge being supplied is 1%, for example, the sludge of the concentration of 6 to 10% is obtained from the centrifugal condensing machine 17. Accordingly, the centrifugal condensing machine 17 reduces the capacity of the raw sludge being supplied to 1/6 to 1/10 and supplies the same through the pipe 19 to an anaerobic digestion tank 23 which is one feature of the present invention. The separated liquid produced by the centrifugal condensing machine 19 is returned through a pipe 21 to the first settling tank 1 included in the waste water treating apparatus and is again treated by the waste water treating apparatus.

The above described anaerobic digestion tank 23 may be of a deep well type. The anaerobic digestion tank 23 comprises an outer tube or an upward flow tube 231 buried extending under the ground deeper than 10 m, say as deep as 100 m, and an inner tube or a downward flow tube 232 inserted in the upward flow tube 231. The downward flow tube 232 forms a downward flow chamber 233 through which a sludge being treated flows downward. The upward flow tube 231 and the downward flow tube 232 altogether define an upward flow chamber 234 therebetween. The downward flow chamber 233 and the upward flow chamber 234 are communicated with each other both at the upper portion thereof and at the lower portion thereof. Thus the anaerobic digestion tank 23 is formed as a circulation type. A head tank 235 is provided at the upper portions of the downward flow chamber 233 and the upward flow chamber 234. The head tank 235 is enclosed at the top portion with a top plate, so that the digestion tank 23 is maintained under anaerobic condition. A rotational stirring means 236 such as a screw is provided at the upper portion of the downward flow chamber 233. A fixed stirring means 237 is provided at the lower portion of the upward flow chamber 234. The fixed stirring means 237 may be plates alternately fixed onto the inner wall of the upward flow tube 231 and the outer wall of the downward flow tube 233 for hindering a flow of the sludge flowing therethrough. The anaerobic digestion tank 23 constructed as described above serves to separate the raw sludge being supplied through the pipe 19 into the carbon dioxide gas ($CO_2$) and methane gas ($CH_4$) through an acid fermentation stage, an acid regression stage and an alkaline fermentation stage. An inherent function and advantage of the anaerobic digestion tank 23 of the deep well type according to the invention is that carbon dioxide gas ($CO_2$) produced with methane gase ($CH_4$) by methane producing bacteria during the anaerobic alkaline fermentation stage is dissolved into the mixed liquor under pressure from the static water pressure head afforded by the deep well type anaerobic digestion tank. The dissolved carbon dioxide reacts in the liquor with free hydrogen ($H_2$) produced by decomposition of the organic matter and is thereby converted to methane gas increasing the methane gas production Thus, the very fact that anaerobic digestion according to the present invention is carried out in a deep well type anaerobic digestion tank increases methane production efficiency as the inherent effect of the increased static pressure head. The digested sludge is supplied from the head tank 235 of the anaerobic digestion tank 23 through the pipe 25 to the mixing tank 27. The mixing tank 27 comprises a stirrer 271, thereby to make uniform the sludge concentration. The digested sludge is supplied from the mixing tank 27 through the pipe 29 to a dewatering machine 31 such as a belt press. A coagulating agent for coagulating the digested sludge and a cleaning water for cleaning a filter are supplied to the belt press 31. Instead of the dewatering machine 31 another type of dewatering means may be employed, such as a filter press, a vacuum dewatering machine, a pressurized dewatering machine, a centrifugal dewatering machine or the like. The separated liquid from the dewatering machine 31 and the cleaning water used for cleaning the filter both returned through a pipe 33 to the first settling tank 1 included in the waste water treating apparatus. On the other hand, a dewatered cake obtained as a result of treatment by the dewatering machine 31 is transferred to a subsequent stage for post-treatment.

The dewatered cake from the dewatering machine 31 is then supplied to a drying machine 35. The dewatered cake is dried by hot air, for example in the drying machine 35. Accordingly, the drying machine 35 requires energy for generating hot air. The dried sludge obtained from the drying machine 35 is then converted into granules by a granulating apparatus 37 and the granules are applied to a melting furnace 39. The melting furnace 39 serves to melt the granules of the dried sludge obtained from the granulating apparatus 37, thereby to convert the same into a molten slag. The drying machine 35 may be "Kubota-Nateko Drier System" manufactured by the assignee of the present invention. The melting furnace 39 may be "Kubota Melting Furnace" manufactured by the assignee of the present invention. The melting furnace 39 serves to melt the dried sludge fed from the granulating apparatus 37 at an elevated temperature of say 1,300° C. or more. To that end, the melting furnace 39 also requires energy source for generating such high temperature.

One feature of the embodiment shown is a provision of a methane gas collecting apparatus 41 in association with the anaerobic digestion tank 23. The methane gas collecting apparatus 41 collects methane gas produced in the head tank 235 of the digestion tank 43 and comprises a collecting tank and a compressor not shown in detail. The methane gas collected by the methane gas collecting apparatus 41 is applied through a gas pipe 43 to the above described drying machine 35 and/or the melting furnace 39 as an energy source. As necessary, the methane gas may also be applied to other apparatuses as an energy source.

Meanwhile, as digestion proceeds, i.e. as methane gas is generated in the anaerobic digestion tank 23, an apparent specific gravity of the sludge in the upward flow chamber 234 becomes smaller than that in the downward flow chamber 233. Accordingly, due to such an apparent specific gravity difference, energy for flowing and circulating the sludge is provided. The screw 236 provides, when the same rotates, energy for circulation and flow from the downward flow chamber 233 to the upward flow chamber 234. The sludge in the digestion tank 23 is caused to flow for circulation between the downward flow chamber 233 and the upward flow chamber 234 through the above described energy.

Now a meritorious effect being achieved by the embodiment shown will be described in comparison with that of a conventional apparatus. Conventionally, the raw sludge was condensed in a gravity condensing tank before the same is introduced into anaerobic digestion tank. The condensation ratio of such gravity condensing tank is 2 to 3% and the ratio of capacity reduction is ½ to ⅓, as described previously. On the other hand, a mechanical condensing means 17 such as a centrifugal condensing machine for use in the present invention achieves the condensation ratio of 6 to 10% and the capacity reduction ratio of 1/6 to 1/10. Assuming that the concentration of a raw sludge before condensation being supplied from a waste water treating apparatus is 1%, for example, this means that a sludge of 1 g is contained in a raw sludge or a mixed liquor of 100 ml. Assuming that the condensation ratio of a conventional gravity condensing tank is 2%, then it follows that a sludge of 1 g is contained in a mixed liquor of 50 ml after condensation and the capacity reduction ratio is ½. By contrast, assuming that condensation of 10% is carried out by utilizing the inventive mechanical condensing means 17, it follows that a sludge of 1 g is contained in a mixed liquor of 10 ml after condensation, which means that the capacity reduction ratio is 1/10. Accordingly, by utilizing a mechanical condensing means 17 in accordance with the present invention, the capacity can further be reduced to 1/5 as compared with a case where a conventional gravity condensing tank is utilized. Due to such drastic capacity reduction, the present invention can drastically reduce the capacity of an anaerobic digestion tank as compared with a conventional one, thereby to drastically save energy for heating the raw sludge.

It has been known that the capacity V required for the digestion tank is given by the following equation (1).

$$V = (Q1 + Q2/2) \times T \quad (1)$$

where Q1 is a supplied amount of raw sludge (m³/day), Q2 is the amount of digested sludge being extracted (m³/day) and T is the number of days for digestion.

Assuming that the raw sludge is condensed by a conventional gravity condensing tank to the concentration of 2% so that the percentage of moisture content of the raw sludge may be 98%, and further assuming that Q1 is 250 m³/day, Q2 is 60 m³/day, and the number of days for digestion is 30 days, 2/3 of an organic matter is gasified and liquefied and the sludge as digested of the percentage of moisture content being 95% is extracted, the digestion tank requires the capacity of approximately 4,650 m³. By contrast, assuming that the raw sludge is condensed by the mechanical condensing means 17 to the concentration of 6% so that the percentage of the moisture content of the raw sludge may be 94%, then Q1 becomes 83.3 (m³/day) and Q2 becomes 43 (m³/day). Therefore, according to the embodiment of the present invention, the capacity of the anaerobic digestion tank 23 may be approximately 2,000 m³. Thus, the present invention can drastically decrease the capacity of the anaerobic digestion tank, as compared with a conventional apparatus.

Furthermore, according to the present invention, the anaerobic digestion tank is buried deep under the ground, which is different from a conventional arrangement. Accordingly, thermal dissipation outside the tank can be suppressed. Therefore, suppression of such thermal dissipation and the above described capacity reduction both make it possible to save consumption of energy, as set forth in the following.

More specifically, the raw sludge being treated is warmed to a necessary temperature, say 35° C., before the same is entered into the digestion tank. The amount of heat C1 necessary for heating the raw sludge to the above described temperature is expressed by the following equation (2).

$$C1 = c \cdot Qi(T_D - T_S) \times 1000 \quad (2)$$

where c is specific heat of the sludge, Qi is the amount of raw sludge being entered, $T_D$ is a digestion temperature, and $T_S$ is a temperature of the raw sludge being entered.

As is clear from the equation (2), one embodiment of the present invention reduces Qi to 1/5 as compared with a conventional one, which can by itself drastically save the amount of heat. In addition, the amount of heat C2 being dissipated from the digestion tank is expressed by the following equation (3).

$$C2 = \Sigma K \cdot A(T_D - T_A) \times 1.2 \quad (3)$$

where K is the ratio of heat transfer through the wall of the digestion tank, A is the area and $T_A$ is an ambient temperature.

In the case of an anaerobic digestion tank of a deep well type for use in the present invention, a major portion of the tank is buried under the ground and has good heat insulation, as compared with a case where the tank is installed on the ground, and accordingly has a small amount of heat being dissipated.

Due to both reduction of the amount of heat C1 necessary for heating the sludge and reduction of the heat of amount C2 being dissipated, as described above, the present invention can drastically save the amount of heat and hence energy, as compared with a conventional system, as is shown in the following by way of a specific example.

| | CALCULATION OF ENERGY | |
|---|---|---|
| | Conventional Type (Gravity Condensation + Ground Type Digestion Tank) | The Inventive Type (Mechanical Condensation + Deep Well Type Digestion Tank) |
| Amount of Sludge Introduced (m³/day) | 250 | 83.3 |
| Capacity of Digestion Tank (m³) | 4650 | 2000 |
| Heating Energy: C1 (kcal/day) | 5000 × 10³ | 1700 × 10³ |
| Dissipating Energy: C2 (kcal/day) | 530 × 10³ (Assuming atmosphere temperature is 15° C.) | 200 × 10³ (Assuming average underground temperature is 15° C.) |
| Total Required Energy: C1 + C2 (kcal/day) | 5530 × 10³ | 1900 × 10³ |

First energy C1 required for heating the sludge to 35° C. will be considered.

The energy for a conventional type is calculated as follows.

$$C1 = 250 \times (35-15) \times 10^3 = 5000 \text{ kcal/day}$$

On the other hand, the energy for the inventive type is calculated as follows.

$$C1 = 83.3 \times (35-15) \times 10^3 = 1667 \approx 1700 \text{ kcal/day}$$

Now the dissipating energy C2 will be considered.

As for the conventional type, it is assumed that a digestion tank provided on the ground is cylindrically shaped and the upper end thereof is covered with a hemispherical roof, with the diameter being 11.4 m, the area of the roof being 408 m$^2$, and the area of the side surface being 810 m$^2$. The dissipation energy in the case of such a conventional digestion tank is calculated as follows.

$$C2 = \{0.7 \times 408 \times (35-15)\} + 0.5 \times 810 \times (35-15) + 1.0 \times 408 \times (35-15) \times 24 \approx 530 \times 10^3 \text{ kcal/day}$$

where 0.7; 0.5 and 1.0 are ratio of heat transfer coefficients.

On the other hand, as regards the inventive digestion tank of a deep well type, assuming that the diameter is 5 m, the depth is 100 m and the thickness of a mortar layer is 0.2 m, then the dissipating energy C2 is calculated as follows.

$$C2 = \{\pi \times 5.4 \times (5 \times 0.303 + 15 + 0.285 + 80 \times 0.244) \times (35-15)\} \times 24 \approx 200 \times 10^3 \text{ kcal/day}$$

where 0.303; 0.285 and 0.244 are ratio of heat transfer coefficients.

As described above, according to the present invention the energy amount required for the whole system can be reduced to approximately ⅜ as compared with the energy requirement of a conventional system.

As described in the foregoing, the amount of heat being dissipated in accordance with the present invention is dependent on the ground temperature. Accordingly, it is sufficient to bury the anaerobic digestion tank 23 to the depth that can suppress dissipation of the heat to the atmosphere and hence to bury the tank 23 so that the same extends to the depth deeper than at least 10 m.

Since the embodiment is further adapted such that the digested sludge is dewatered by the dewatering machine 31, as compared with a case where a raw sludge as not digested is dewatered, several advantages are brought about. The concentration of sludge is made uniform, the percentage of organic matter content becomes small and dewatering is easy, a dosage amount of an agent may be small, and the like. Assuming that the amount of raw sludge being treated is 250 (m$^3$/day), in a case where a raw sludge condensed by a conventional gravity condensation approach is to be directly dewatered, the percentage of moisture content of the raw sludge is 98% and accordingly it is necessary to employ two belt presses of 3 m width. If the raw sludge as condensed by a conventional gravity condensation approach is first digested and then the same is dewatered, then one belt press of 1.5 m width would be sufficient. By contrast, according to the present invention, the raw sludge is condensed by means of the mechanical condensing means 17 and digested in tank 23 and is then dewatered and therefore one belt press of 1 m width is sufficient. In the foregoing, it was assumed that the belt press is done for eight hours per day. By thus utilizing the mechanical condensing means 17, the capacity of a dewatering machine can be drastically reduced as compared with a conventional one.

Figure 2:
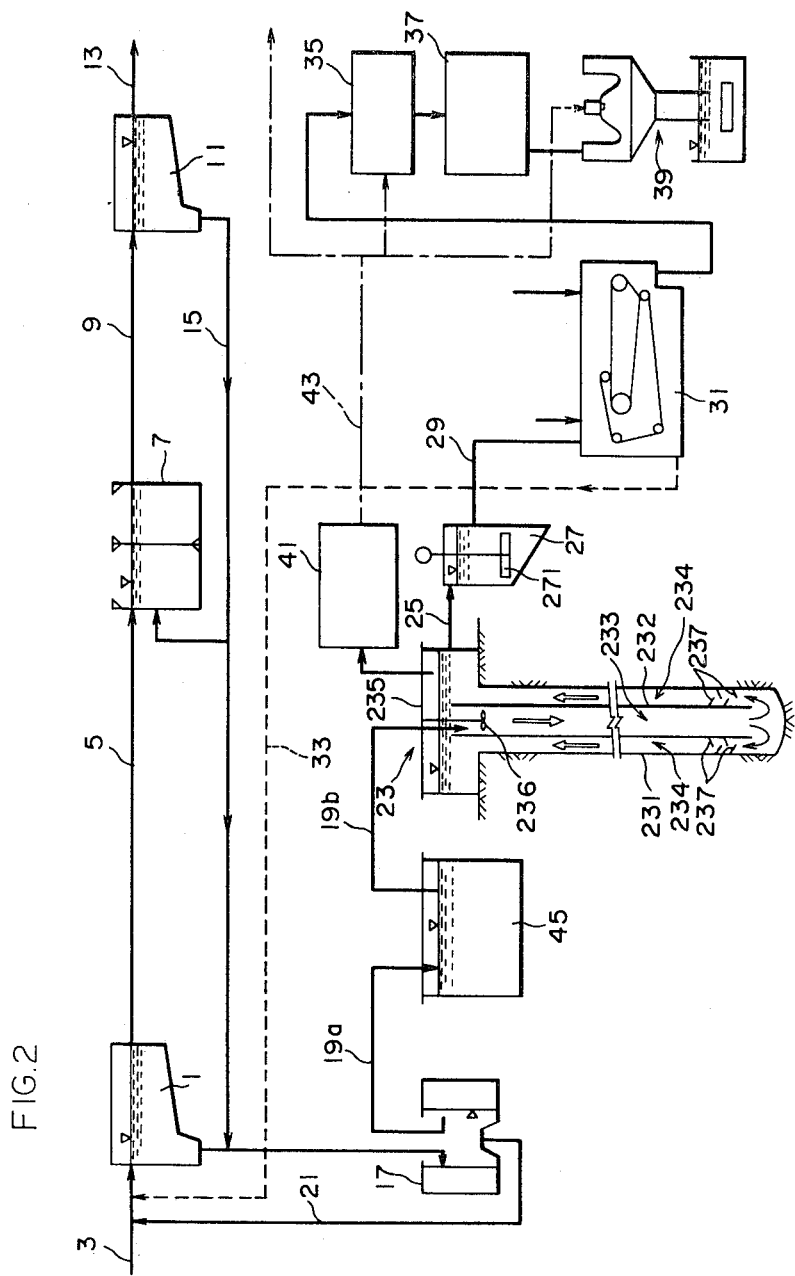
FIG. 2 is a flow diagram showing another embodiment of the present invention.

FIG. 2 is a flow diagram showing another embodiment of the present invention. The embodiment shown is characterized by a provision of a separate tank 45 between the mechanical condensing means 17 and the anaerobic digestion tank 23 of a deep well type.

As well known, anaerobic digestion process progresses through the three stages, i.e. an acid fermentation stage, an acid regression stage and an alkaline fermentation stage. At the acid fermentation stage, carbohydrate is decomposed as a function of organic acid producing bacteria to produce fatty acid of low molecular weight. Due to such an abrupt organic acid production, pH decreases. At the acid regression stage decomposition of organic acid and dissolving nitrogen compound takes place, thereby to cause an increasing tendency of pH. At the alkaline fermentation stage cellulose and nitrogen compound are fully destroyed, whereby organic acid previously produced is decomposed to carbon dioxide gas and methane gas. The microorganism acting in the alkaline fermentation stage comprises methane producing bacteria. Methane producing bacteria are anaerobic bacteria. The range of pH where the activity of methane producing bacteria is maintained is 6.4 to 7.2. On the other hand, the range of pH where the activity of the above described organic acid producing bacteria is maintained is less severe and a sufficient activity is exhibited even when pH value is about 5.1.

The FIG. 1 embodiment was adapted such that all of the above described acid fermentation stage, the acid regression stage and the alkaline fermentation stage are made to proceed in one anaerobic digestion tank 23. Accordingly, it follows that the acid fermentation and the alkaline fermentation proceed substantially at the same time. At the acid fermentation stage pH value abruptly decreases to about 5.1, as described previously. On the other hand, the value of pH suited for methane producing bacteria is 6.4 to 7.2 Therefore, the reaction corresponding to the alkaline fermentation stage is suppressed due to the above described decrease of pH, which results in a decrease of the treatment efficiency. Accordingly, the FIG. 2 embodiment is adapted such that the reaction at a time period corresponding to the acid fermentation stage and the acid regression stage is made to progress in the separate tank 45 while the reaction at a time period corresponding to the alkaline fermentation stage is mainly made to proceed in the anaerobic digestion tank 23. The tank 45 may be maintained under an anaerobic condition. Since the FIG. 2 embodiment makes it possible that the reaction up to the acid regression stage is almost completed in the tank 45 and then the reaction of the alkaline fermentation stage is completed in the anaerobic tank 23, the reaction can proceed with a good efficiency as compared with a case where all the processes proceed in one tank. Since pH values can be adjusted separately in the tank 45 and the tank 23, it is possible to readily set the value of pH to a value most suited for the respective bacteria. As a result, the treatment efficiency is much more enhanced.

Figure 3:
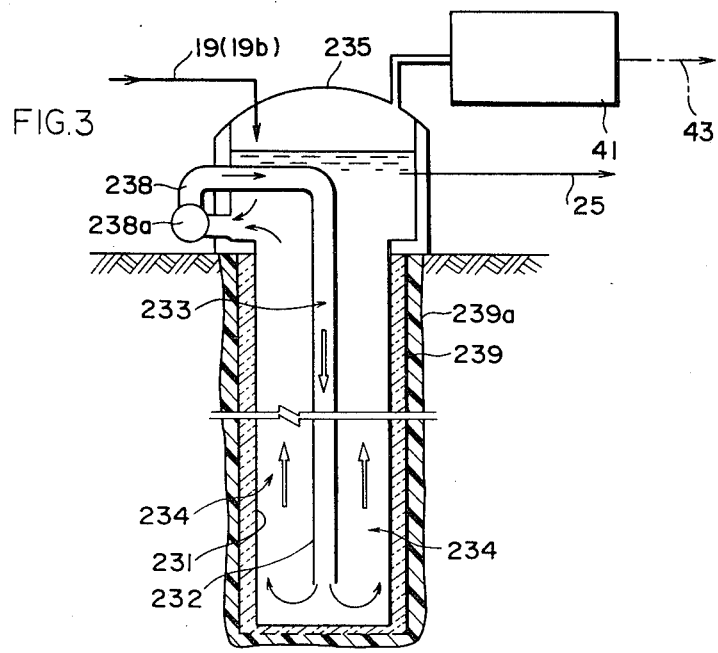
FIG. 3 is a sectional view showing another example of a digestion tank.

FIG. 3 is a sectional view showing another example of the anaerobic digestion tank. The FIG. 3 embodiment is characterized by a provision of a circulating path 238 for stirring the sludge in the tank and a circulation pump 238a inserted in the path. Another feature of the FIG. 3 embodiment is a provision of a heat insulating layer 239 around the upward flow tube 231. The circulation pump 238 serves to circulate forcedly into the downward flow chamber 233 the sludge flowing through the upward flow chamber 234. By doing so, stirring of the sludge is expedited, as compared with the embodiments shown in FIGS. 1 and 2, whereby the digestion reaction is also expedited. The heat insulating layer 239 may be of foamed resin such as foamed styrene, foamed urethane or the like, and other well known heat insulating material. The heat insulating layer 239 suppresses thermal dissipation from the digestion tank to the outside. Therefore, energy required for heating the sludge can be correspondingly reduced. Meanwhile, the outer surface of the insulating layer 239 is covered with a mortar layer 239a. Although the heat insulating layer 239 was formed throughout the full-length of the upward flow tube 231 in FIG. 3, the heat insulating layer 239 may be formed to cover only a portion of the outer surface of the upward flow tube 231, as necessary, while the remaining portion may be covered with a mortar layer 239a.

Figure 4:
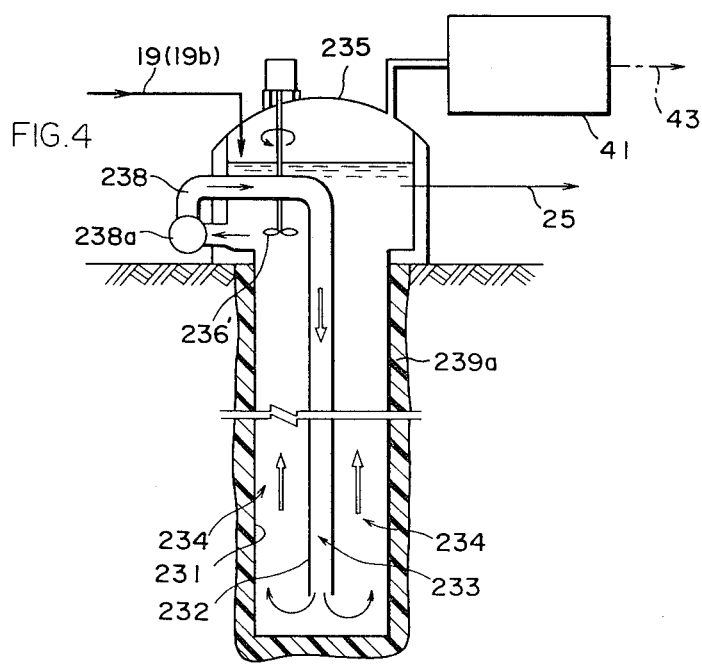
FIG. 4 is a sectional view showing a further embodiment of a digestion tank.

FIG. 4 is a sectional view of a further example of an anaerobic digestion tank. The FIG. 4 embodiment is characterized by provision of a screw 236' for the purpose of expediting a debubbling function of the sludge. The screw 236' is provided in the head tank 235 at the upper portion of the upward flow chamber 234. The screw 236' serves to stir forcedly the sludge flowing into the pump 238a, thereby to remove the bubbles of gas contained in the sludge. At the same time, the screw 236' serves to block a flow of gas flowing toward the circulation path 238, thereby to prevent the gas from being carried into the pump 238a together with the sludge.

Meanwhile, in order to expedite the bubble removing function, various modifications may be employed, for example, a rake-like member may be fixed to the driving shaft, apart from the above described stirring screw 236'. Any and all of such modifications as well as the stirring screw are herein referred to as rotational stirring means.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for treating a sludge produced by waste water treatment, comprising: mechanical condensing means (17) for forcedly condensing a produced raw sludge, an anaerobic digestion tank (23) of a deep well type buried to extend under the ground in the depth direction, fluid conduit means operatively connecting said digestion tank to said condensing means for receiving and anaerobically digesting the raw sludge condensed by said mechanical condensing means, said anaerobic digestion tank comprising a downward flow chamber extending in the depth direction for flowing a sludge being treated downwardly therethrough, an upward flow chamber disposed in association with said downward flow chamber and also extending in the depth direction, fluid communication means between said upward flow chamber and said downward flow chamber for flowing a sludge being treated therethrough in the upward direction, circulating means operatively connected to said downward flow chamber and said upward flow chamber for forcedly circulating the sludge being treated between said downward flow chamber and said upward flow chamber and for expediting the reaction in said anaerobic digestion tank, and enclosure means for maintaining said digestion tank in an anaerobic condition, whereby conversion from fatty acid into methane gas and carbon dioxide takes place during the anaerobic digestion in said tank with simultaneous conversion from said carbon dioxide into methane gas as a result of the static pressure head afforded by the deep well location of said anaerobic digestion tank, said apparatus further comprising dewatering means operatively connected to said anaerobic digestion tank for receiving and dewatering the sludge digested by said anaerobic digestion tank, methane gas collecting means operatively connected to said anaerobic digestion tank for collecting methane gas produced in said anaerobic digestion tank, and post-treatment means operatively connected to said dewatering means for further treating the digested sludge after the sludge has been dewatered by said dewatering means, said post-treatment means comprising heat generating means, means operatively connected to said methane gas collecting means for supplying said methane gas collected by said methane gas collecting means to said post-treatment means as a source of energy for said heat generating means.

2. The sludge treating apparatus of claim 1, further comprises a separate tank interposed between and fluidly communicating with said mechanical condensing means and said anaerobic digestion tank for performing a reaction corresponding to an acid fermentation and an acid regression, and wherein said anaerobic digestion tank substantially performs an anaerobic digestion corresponding to an alkaline fermentation.

3. The sludge treating apparatus of claim 2, wherein said separate tank comprises closure means to form a further anaerobic tank.

4. The sludge treating apparatus of claim 1, wherein said anaerobic digestion tank of the deep well type is buried extending under the ground in the depth direction deeper than 10 m for providing a respective static pressure head in said anaerobic digestion tank.

5. The sludge treating apparatus of claim 4, wherein said anaerobic digestion tank is buried extending under the ground in the depth direction to a depth in the range of 10 m to 100 m.

6. The sludge treating apparatus of claim 1, further comprising: stirring means for stirring the sludge being treated in said anaerobic digestion tank for expediting the reaction in said anaerobic digestion tank.

7. The sludge treating apparatus of claim 6, wherein said stirring means comprises rotational stirring means for stirring the sludge being treated through rotation thereof.

8. The sludge treating apparatus of claim 6 or 7, wherein said stirring means comprises fixed stirring means fixedly provided at a portion of said upward flow chamber.

9. The sludge treating apparatus of claim 1, wherein said anaerobic digestion tank comprises a downward flow tube constituting said downward flow chamber, and an upward flow tube for forming said upward flow chamber together with said downward flow tube.

10. The sludge treating apparatus of claim 9, wherein said downward flow tube is disposed in said upward flow tube.

11. The sludge treating apparatus of claim 10, further comprising: heat insulating means provided outside said upward flow tube.

* * * * *